US008701080B2

(12) United States Patent  
Tripathi

(10) Patent No.: US 8,701,080 B2  
(45) Date of Patent: Apr. 15, 2014

(54) TEMPLATE COMPONENTS HAVING CONSTRAINTS REPRESENTATIVE OF BEST PRACTICES IN INTEGRATION SOFTWARE DEVELOPMENT

(75) Inventor: Debadatta Tripathi, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 274 days.

(21) Appl. No.: 13/050,342

(22) Filed: Mar. 17, 2011

(65) Prior Publication Data

US 2011/0246961 A1 Oct. 6, 2011

(30) Foreign Application Priority Data

Apr. 5, 2010 (IN) .............................. 951/CHE/2010

(51) Int. Cl.
*G06F 9/44* (2006.01)
*G06F 3/048* (2013.01)

(52) U.S. Cl.
USPC ............................ 717/105; 717/113; 715/763

(58) Field of Classification Search
None
See application file for complete search history.

(56) References Cited

U.S. PATENT DOCUMENTS

| | | | | |
|---|---|---|---|---|
| 6,931,288 B1 * | 8/2005 | Lee et al. ........................ | 700/86 |
| 7,305,372 B2 | 12/2007 | Bridges et al. | |
| 7,472,103 B1 * | 12/2008 | Yang ............................. | 706/52 |
| 7,536,676 B2 * | 5/2009 | Baker et al. ................... | 717/113 |
| 7,584,451 B2 | 9/2009 | Iborra et al. | |
| 7,593,927 B2 | 9/2009 | MacLennan et al. | |
| 7,650,574 B2 * | 1/2010 | Nattinger ....................... | 715/763 |
| 7,650,594 B2 * | 1/2010 | Nattinger ....................... | 717/125 |
| 7,797,673 B2 * | 9/2010 | Szpak ............................ | 717/105 |
| 8,069,434 B2 * | 11/2011 | Ploesser et al. ............... | 717/104 |
| 2006/0059461 A1 * | 3/2006 | Baker et al. ................... | 717/113 |
| 2009/0113380 A1 * | 4/2009 | Ploesser et al. ............... | 717/104 |
| 2011/0161917 A1 * | 6/2011 | Thomson et al. ............. | 717/105 |
| 2011/0276913 A1 * | 11/2011 | Tripathi et al. ............... | 715/771 |

OTHER PUBLICATIONS

White, J., et al., "Introduction to the Generic Eclipse Modeling System," Eclipse Magazine [online], 2007 [retrieved Aug. 17, 2013], Retrieved from Internet: <http://www.dre.vanderbilt.edu/~schmidt/PDF/Eclipse_Magazine_Volume06.pdf>, pp. 11-19.*

(Continued)

*Primary Examiner* — Isaac Tecklu
*Assistant Examiner* — Todd Aguilera
(74) *Attorney, Agent, or Firm* — Mannava & Kang, P.C.

(57) ABSTRACT

A plurality of icons are presented via a graphical user interface, each of the icons representative of a template component that incorporates component-specific constraints representative of best practices in integration software development projects. Configuration information in response to configuration prompts related to a selected icon is received. In order to enforce best practices on the integration software development project, the configuration information may be compared with the component-specific constraints such that an error indication is displayed via the graphical user interface whenever the configuration information does not compare favorably with the component-specific constraints. Receipt of the selection information also causes an instance of the template component corresponding to the icon to be created, with the resulting instantiated component configured according to the configuration information. The configured component is stored as a part of a design model for the integration software development project.

20 Claims, 5 Drawing Sheets

(56) References Cited

OTHER PUBLICATIONS

Aldrich, J., "Language Support for Connector Abstractions," ECOOP 2003—Object Oriented Programming Lecture Notes in Computer Science [online], vol. 2743, 2003 [retrieved Aug. 17, 2013], Retrieved from Internet: http://link.springer.com/chapter/10.1007/978-3-540-45070-2_5#>, pp. 74-102.*

"GEMS Metamodeling Tutorial" found at http://wiki.eclipse.org/GEMS_Metamodeling_Tutorial, on Dec. 17, 2009.

* cited by examiner

TEMPLATE COMPONENTS HAVING CONSTRAINTS REPRESENTATIVE OF BEST PRACTICES IN INTEGRATION SOFTWARE DEVELOPMENT

FIELD OF THE INVENTION

The instant disclosure relates generally to software development and, in particular, to the use of template components embodying best practices relating to integration software development projects.

BACKGROUND OF THE INVENTION

In one of its embodiments, system integration encompasses the process of linking together different computing systems, typically through the functional coupling of software applications. To this end, additional integration software and/or hardware is often designed, created, tested, deployed and maintained to achieve the desired result; in a sense, the integration software/hardware is the "glue" used to join the different computing systems together. Such integration software and/or hardware is typically designed by an integration designer. A typical prior art process employed by integration designers is illustrated in FIG. 1.

As shown in FIG. 1, when undertaking an integration software development project, an integration designer uses a number of different sources to produce design documentation, i.e., one or more documents used to define the structure and operation of the desired integration software. Such design documentation typically takes the form of one or more text or graphical documents (produced using, for example, the "MICROSOFT" Word and/or "VISIO" authoring tools) and is used by production teams to engage in the actual creation of the necessary software code. As shown, the integration designer typically reads project requirements comprising one or more documents broadly defining desired outcomes and/or conditions for a project, as well as project architecture documentation, which attempts to define at a high-level the various necessary software components, including their functions and relationships. A knowledge repository, comprising documentation from previous, potentially similar, integration projects may also be consulted by the integration designer in order to maximize reuse of previously successful integration solutions. Furthermore, as shown, the integration designer will typically attempt to incorporate best practices into the design documents. Such best practices reflect the design strategies that, as demonstrated by the collective experience of the organization developing the integration software, have typically lead to the best quality software in terms of reliability, testability, efficiency, usability, etc. Using such best practices, the integration designer is provided guidance such that the resulting design documentation is most likely to lead to superior quality of the software code. As further part of the integration design process, a design reviewer will review the resulting design documentation based on an understanding of the requirements documentation and use of a review checklist that condenses and combines the most salient aspects of the project architecture and best practices.

While the process illustrated in FIG. 1 can be effectively employed, it is highly dependent upon manual execution by the integration designer and design reviewer and their respective levels of individual expertise. It would therefore be advantageous to provide a solution that overcomes the dependence on manually producing the desired design and dependence upon individual expertise, preferably through the use of automation.

SUMMARY OF THE INVENTION

The instant disclosure describes techniques for incorporating automation into the design process for integration software development projects. In an embodiment, a plurality of icons are presented via a graphical user interface, each of the icons representative of a template component that incorporates component-specific constraints representative of best practices in integration software development projects. In response to receiving selection information corresponding to one of the icons via a user input device, configuration prompts related to the icon are displayed via the graphical user interface. Responsive to the configuration prompts, configuration information is received. In order to enforce best practices on the integration software development project, the configuration information may be compared with the component-specific constraints such that an error indication is displayed via the graphical user interface whenever the configuration information does not compare favorably with the component-specific constraints. Receipt of the selection information also causes an instance of the template component corresponding to the icon to be created, with the resulting instantiated component configured according to the configuration information. The configured component is stored as a part of a design model for the integration software development project. This process may be repeated to build up the design model, which may be represented in an XML or XML-like format and effectively becomes the design documentation for the integration software development project. In an embodiment, patterns, comprising previously configured template components, may be selected and incorporated into a design model. In another embodiment, the design model generated in this fashion may be employed to automatically generate initial software code for the integration software development project. In this manner, the instant disclosure provides techniques that improve the design process for integration software development projects.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
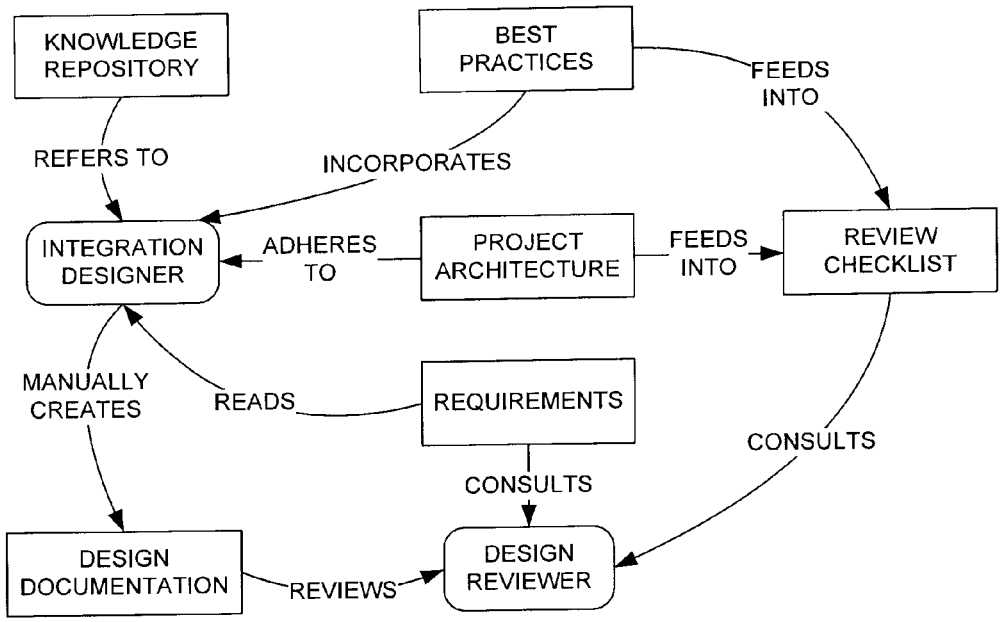
FIG. 1 is a block diagram illustrating a prior art process for integration development projects.
Figure 2:
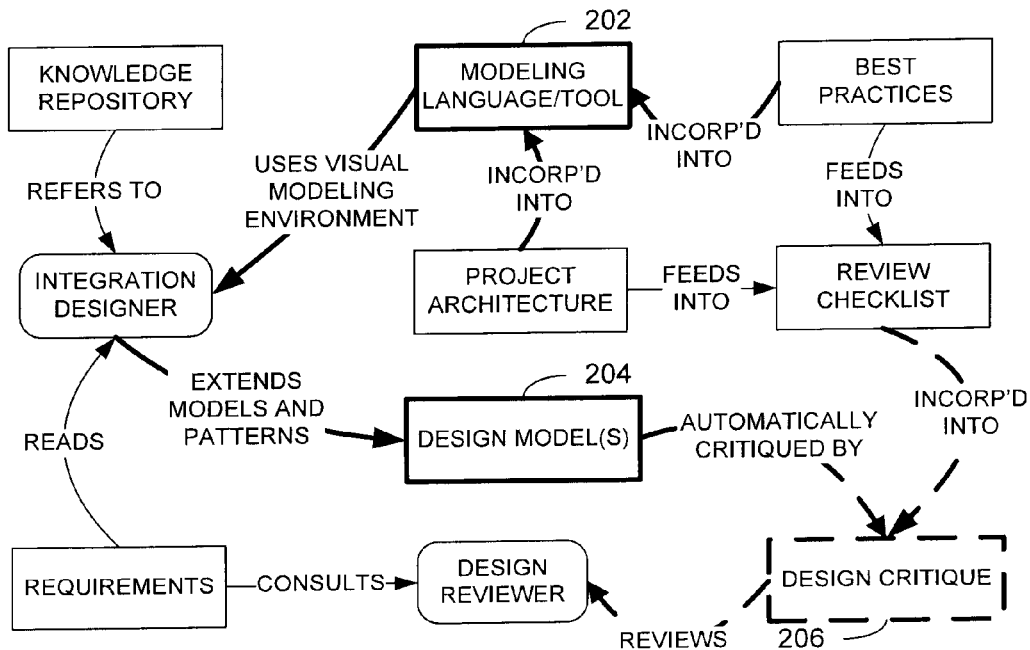
FIG. 2 is a block diagram illustrating an improved process for integration development projects.

Referring now to FIG. 2, an improved process for integration software development projects, which may be enabled by the teachings of the instant disclosure, is illustrated. As in FIG. 1, the process illustrated in FIG. 2 revolves around the activities of the integration designer and design reviewer. However, as highlighted by the bold lines, the process of FIG. 2 incorporates the use of a modeling language/tool 202 which may be used by the integration designer to produce one or more design models 204, as well as an optional design critique tool 206 that automatically critiques any design model. In this embodiment, the modeling language/tool 202 provides a graphical user interface that facilitates the rapid configuration of a design model, as described in further detail below. Furthermore, the modeling language/tool 202 is configured to incorporate the project architecture and best practices information thereby removing (or at least minimizing) the burden placed on the integration designer to expressly incorporate such information into the design. As described in further detail below, the modeling language/tool 202 may be readily implemented using existing software applications. Using the modeling language/tool 202, the integration designer produces one or more design models 204 that are preferably represented in an Extensible Markup Language (XML) or XML-like format. In this format, the design models are readily searchable using known computer-based searching techniques.

Figure 3:
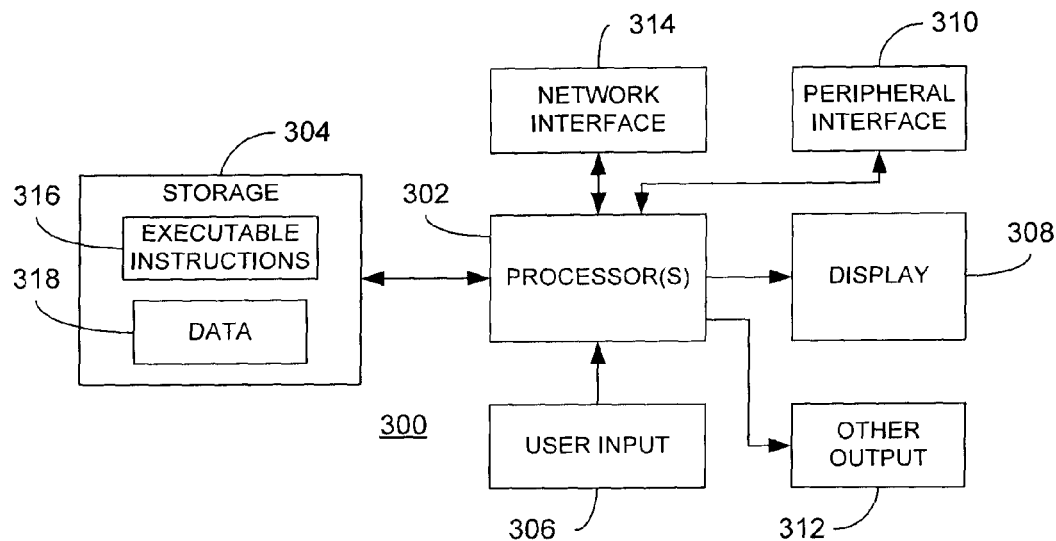
FIG. 3 is a block diagram of a processing device that may be used to implement various aspects of the improved process illustrated in FIG. 2.

FIG. 3 illustrates a representative processing device 300 that may be used to implement the teachings of the instant disclosure. The device 300 may be used to implement, for example, one or more components of the system 400 of FIG. 4, the processing illustrated in FIG. 5 and/or implement the graphical user interface of FIGS. 6 and 7, as described in greater detail below. Regardless, the device 300 comprises a processor 302 coupled to a storage component 304. The storage component 304, in turn, comprises stored executable instructions 316 and data 318. In an embodiment, the processor 302 may comprise one or more processing devices such as a microprocessor, microcontroller, digital signal processor, or combinations thereof capable of executing the stored instructions 316 and operating upon the stored data 318. Likewise, the storage component 304 may comprise one or more devices such as volatile or nonvolatile memory including but not limited to random access memory (RAM) or read only memory (ROM). Processor and storage arrangements of the types illustrated in FIG. 3 are well known to those having ordinary skill in the art. In one embodiment, the processing techniques described herein are implemented as a combination of executable instructions and data within the storage component 304.

As shown, the device 300 may comprise one or more user input devices 306, a display 308, a peripheral interface 310, other output devices 312 and a network interface 314 in communication with the processor 302. The user input device 306 may comprise any mechanism for providing user input (such as selection information concerning icons, configuration information, etc. as described below) to the processor 302. For example, the user input device 306 may comprise a keyboard, a mouse, a touch screen, microphone and suitable voice recognition application or any other means whereby a user of the device 300 may provide input data to the processor 302. The display 308, may comprise any conventional display mechanism such as a cathode ray tube (CRT), flat panel display, or any other display mechanism known to those having ordinary skill in the art. In an embodiment, the display 308, in conjunction with suitable stored instructions 316, may be used to implement a graphical user interface. Implementation of a graphical user interface in this manner is well known to those having ordinary skill in the art. The peripheral interface 310 may include the hardware, firmware and/or software necessary for communication with various peripheral devices, such as media drives (e.g., magnetic disk or optical disk drives), other processing devices or any other input source used in connection with the instant techniques. Likewise, the other output device(s) 312 may optionally comprise similar media drive mechanisms, other processing devices or other output destinations capable of providing information to a user of the device 300, such as speakers, LEDs, tactile outputs, etc. Finally, the network interface 314 may comprise hardware, firmware and/or software that allows the processor 302 to communicate with other devices via wired or wireless networks, whether local or wide area, private or public, as known in the art. For example, such networks may include the World Wide Web or Internet, or private enterprise networks, as known in the art.

While the device 300 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Further still, other implementations of the device 300 may include a greater or lesser number of components than those illustrated. Once again, those of ordinary skill in the art will appreciate the wide number of variations that may be used is this manner. Further still, although a single processing device 400 is illustrated in FIG. 4, it is understood that a combination of such processing devices may be configured to operate in conjunction (for example, using known networking techniques) to implement the teachings of the instant disclosure.

Figure 4:
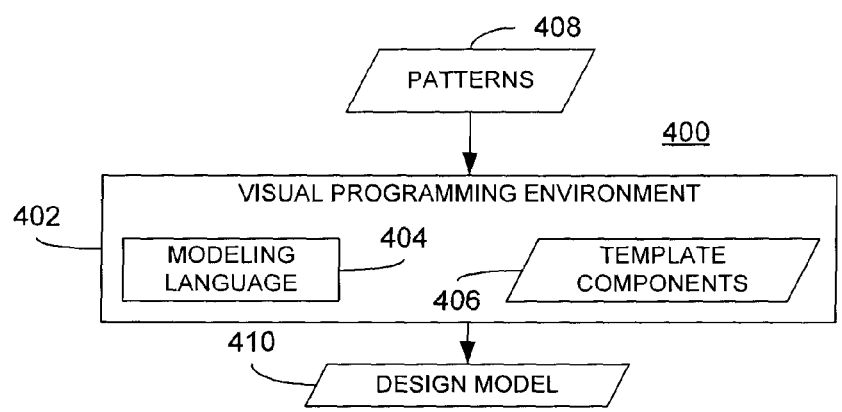
FIG. 4. is a block diagram of an apparatus in accordance with an embodiment described herein.

Referring now to FIG. 4, a system 400 is illustrated that may be used to implement various features of the improved design process illustrated in FIG. 2. As shown, the system 400 comprises a visual programming environment 402 that implements a modeling language 404 and template components 406. Optionally, the visual programming environment 402 can also operate using one or more patterns 408. Using the visual programming environment 402, an integration designer can produce a design model 410.

In an embodiment, the visual programming environment 402 may be implemented using any of a number of well known tools that assist in the development of a domain specific modeling language (DSML), such as the Generic Eclipse Modeling System (GEMS) used in conjunction with the Eclipse integrated software development environment (IDE). As known in the art, GEMS (and other similar tools) permit the creation of metamodels specifying the modeling paradigm of the application domain, i.e., the modeling language 404 and template components 406. In the context of the instant disclosure, the particular application domain is integration software development.

A model is an abstraction of phenomena in the real world, whereas a metamodel is yet another abstraction concerning properties of the model itself. Thus, a model conforms to its metamodel in the way that a computer program conforms to the grammar of the programming language in which it is written. Using the GEMS (or other) tool, a metamodel can be created that contains all the syntactic, semantic, and presentation information applicable to the particular domain. That is, the metamodel describes which template components will be used to construct models, what relationships may exist among those template components, how the template components may be organized and viewed by the modeler, and rules governing the construction of models. In this manner, the metamodel defines the family of models that can be created thereby.

Figure 6:
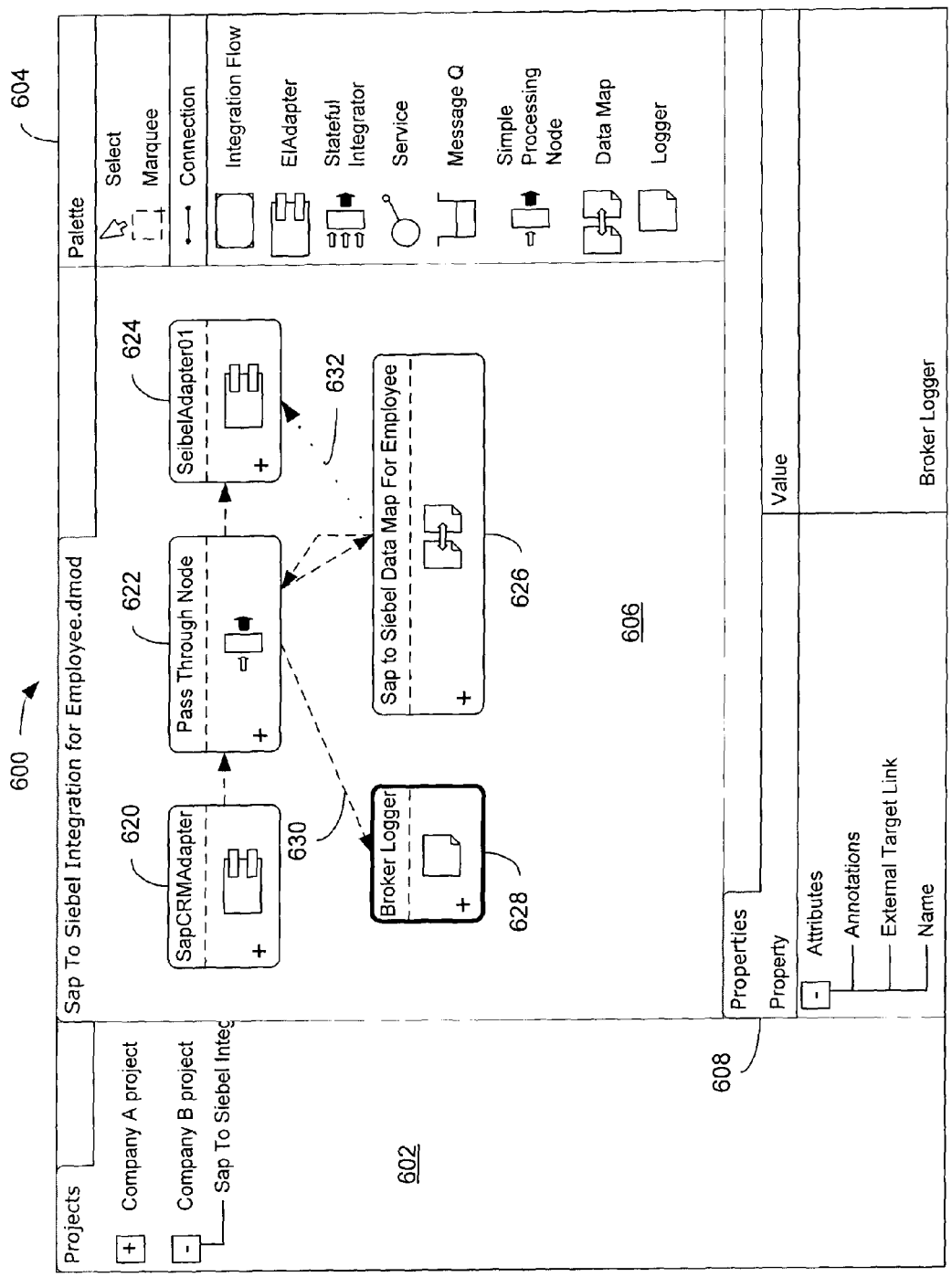
FIGS. 6 and 7 are examples of a graphical user interface illustrating an application of the various embodiments described herein.
Figure 7:
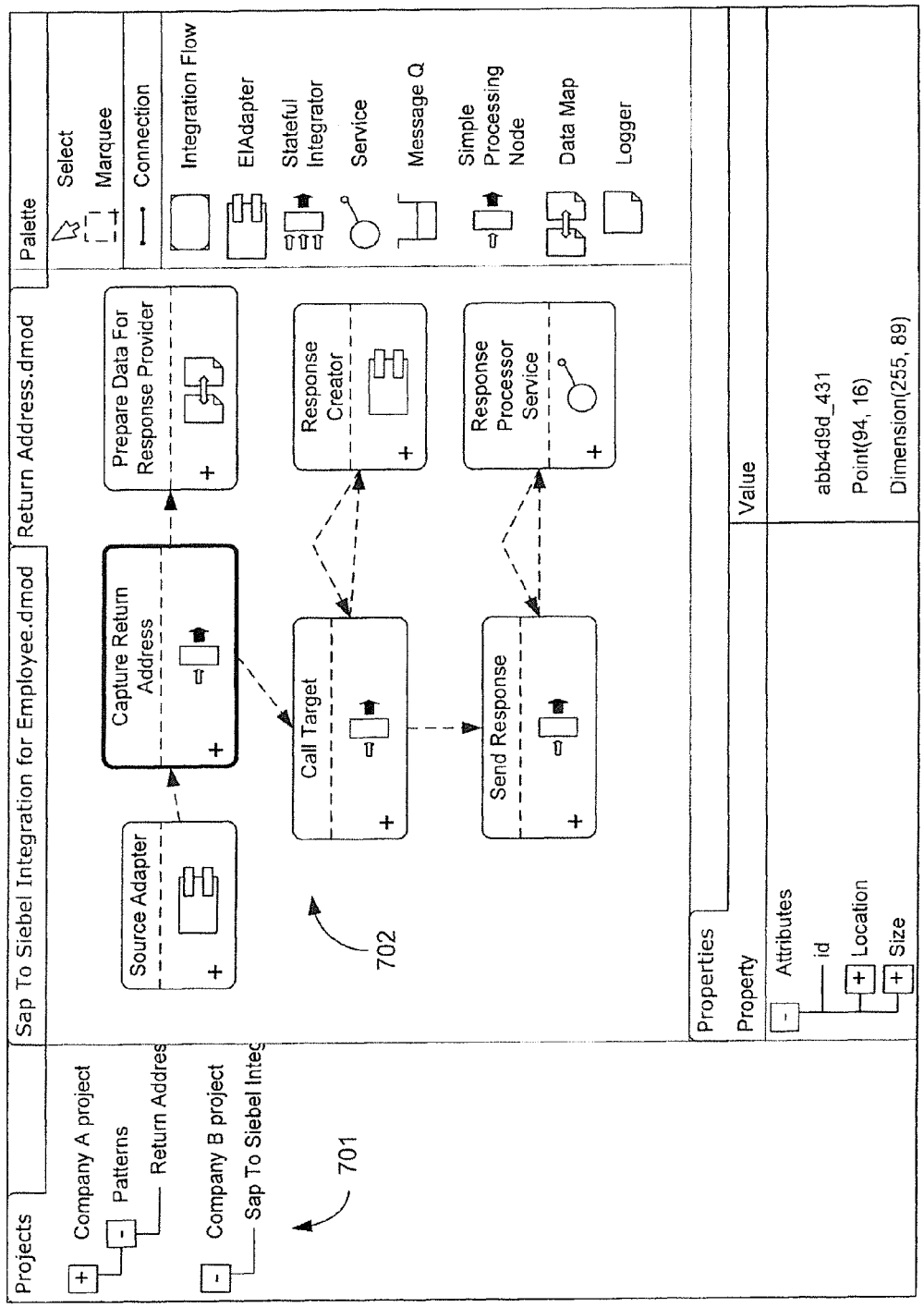

Each of the template components 406 embodies a generic schema of domain-specific functionality as defined according to the modeling language 404. For example, in the context of the instant disclosure, each template component 406 represents specific functionality concerning integration software development. Examples of specific templates in this vein are illustrated in FIGS. 6 and 7, where templates components for an Integration Flow, Enterprise Integration (EI) Adapter, Stateful Integrator, Service, Message Queue, Simple Processing Node, Data Map and Logger are illustrated. In an embodiment, the Connector used to link together selected template components is also considered a template component that may be configured, as described below.

In the context of the GEMS tool, once a metamodel has been created, a GEMS plug-in generator can be invoked to create the modeling tool based on the metamodel. The modeling tool is an instance (i.e., executable software code) of a graphical user interface and associated functionality that permits a user to generate models (e.g., integration design models applicable to a given integration software development project) that adhere to the capabilities and limitations built into the modeling tool. In the context of the instant disclosure, a design model constructed in this manner will be adherent to the constraints specific to the integration software development DSML. As described in further detail below, the modeling tool is capable of invoking instances of the template components 408 to be configured in the construction of a model 410.

As noted above, specific template components 406 relating to integration software development are provided. The descriptions and tables set forth below provide additional details concerning each type of template component 406 currently defined.

An EI Adapter (or just Adapter) represents a component that provides connectivity to a specific type of software system (e.g., an SAP adapter, a Peoplesoft adapter, a database adapter, etc). Apart from connectivity, it also provides facility to execute transactions on a specific system that it connects to, or detect changes in that specific system. Table 1 below sets forth the attributes and descriptions thereof concerning an EI Adapter.

TABLE 1

| Instance Name | Name of specific instance of the EIAdapter type component |
|---|---|
| Description | Description of the EI Adapter instance |
| Adapter Type | SAP, Peoplesoft, Database, File, Messaging, Web Service, Siebel, Oracle Apps, Mainframe, Other |
| Application Name | Name of the application that the EI Adapter instance connects to |
| Connectivity | Credentials needed for connecting to the specific system. |

A Message Queue enables asynchronous communications by storing messages until it is picked up for processing by a program or component. A message queue is contained by a Queue Manager. Table 2 below sets forth the attributes and descriptions thereof concerning a Message Queue.

TABLE 2

| Instance Name | Name of the instance of the message queue |
|---|---|
| Description | Description of the specific message queue |
| Q Manager Name | The queue manager that owns the queue. |
| Connectivity | Credentials needed for connecting to the specific system. |

A Simple Processing Node is a component that performs simple business logic with a single input and a single output. The single input and single output may be a complex data structure involving multiple discrete data items. Table 3 below sets forth the attributes and descriptions thereof concerning a Simple Processing Node.

TABLE 3

| Name | Name of the instance of the simple processing node |
|---|---|
| Description | Description of its functionality |

A Web Service is a software system designed to support interoperable machine-to-machine interaction over a network. It has an interface described in a machine-processable format (specifically Web Services Description Language WSDL). Other systems interact with the web service in a manner prescribed by its description using Simple Object Access Protocol (SOAP) messages, typically conveyed using hypertext transfer protocol (HTTP) with an extensible markup language (XML) serialization in conjunction with other web-related standards. Table 4 below sets forth the attributes and descriptions thereof concerning a Web Service.

TABLE 4

| Name | Name of the web service |
|---|---|
| Provider Name | Name of the provider of the service |
| WSDL | The path to the WSDL (Web Service Definition Language) definition of the service |
| Access Mode | Defines how typically this service is accessed. Can be synchronous/asynchronous |
| SLA | Defines service level agreements applicable for the service. This could define response time, throughput, availability etc |

A Map is a component that transforms a source data structure into a destination data structure. Maps accept multiple inputs and provides a single output. Maps are significant in the integration domain since most applications have their own proprietary data structures and any kind of synchronization between applications requires transformation. Table 5 below sets forth the attributes and descriptions thereof concerning a Map.

TABLE 5

| Name | Name of the mapping component |
|---|---|
| Description | Description of the mapping component |
| SourceData | Source Data is the input data structure that is passed into the Map for transformation |
| TargetData | The resultant data structure created by the Map after executing the transformation routines |

A File is a resource for storing information. From an integration domain perspective, a File could represent an input or output data format, or any persistent data stored in a file that is required for processing. Table 6 below sets forth the attributes and descriptions thereof concerning a File.

TABLE 6

| | |
|---|---|
| Name | Name of the file |
| Description | Description of the file and its contents |
| Extension | The 3 letter extension of the file |
| Path | The absolute path of the file location |
| Format | The format of the file contents |

A Logger is a component that logs processing information for potential troubleshooting need. Table 7 below sets forth the attributes and descriptions thereof concerning a Logger.

TABLE 7

| | |
|---|---|
| Name | Name of the logger component |
| Log Destination | Destination of the log messages |

A Filter Node is a special type of a Simple Processing Node (described above) that suppresses/or allows only a certain set of data based on either its type or content. Table 8 below sets forth the attributes and descriptions thereof concerning a Filter Node.

TABLE 8

| | |
|---|---|
| Name | Name of the filter component |
| Description | Description of the Filter component |
| Filter Logic | Details the filtering logic implemented |

A Lookup Node is a special type of Simple Processing Node (described above) that looks up a specific code in a persistent data store to determine a corresponding decoded value. Table 9 below sets forth the attributes and descriptions thereof concerning a Lookup Node.

TABLE 9

| | |
|---|---|
| Name | Name of the Lookup Node |
| Description | Description of the Lookup Node |
| Lookup Logic | Details the lookup logic implemented |

A Complex Processing Node is a component that performs complex business logic with single inputs and a single output. A Complex Processing Node may perform several call-outs to other components/constructs to complete its task. Table 10 below sets forth the attributes and descriptions thereof concerning a Complex Processing Node.

TABLE 10

| | |
|---|---|
| Name | Name of the Complex Processing Node |
| Description | Description of the Complex Processing Node |

An Exception Handler is a special type of Complex Processing Node that can accept multiple inputs (only exception types) from different components and has one output. Table 11 below sets forth the attributes and descriptions thereof concerning an Exception Handler.

TABLE 11

| | |
|---|---|
| Name | Name of the Exception Handler |
| Description | Description of the Exception Handler |

As noted above, Connectors are another type of template component. In an embodiment, Connectors have the attributes of: Name (a name of the Connector), a Description (a descriptions of the Connector) and Data (specifying the data type for the Connector). Table 12 below further describes specific types of Connectors and their relationships relative to the various other types of template components described above.

TABLE 12

| Connection Name | Description | Allowed Source Construct(s) | Allowed Destination Construct |
|---|---|---|---|
| Transformation Request | Represents a request for a transformation | Simple Processing Node<br>Complex Processing Node | Map<br>Map |
| Transformation Response | Represents a response from a Map | Map<br>Map | Simple Processing Node<br>Complex Processing Node |
| Service Request | Represents a request to a Web Service | Simple Processing Node<br>Complex Processing Node<br>Web Service<br>Exception Handler<br>Map | Web Service<br>Web Service<br>Web Service<br>Web Service<br>Web Service |
| Service Response | Represents a response from a Web Service | Web Service<br>Web Service<br>Web Service<br>Web Service<br>Web Service | Simple Processing Node<br>Complex Processing Node<br>Web Service<br>Exception Handler<br>Map |
| Adapter Request | Represents a request to an Adapter | Simple Processing Node<br>Complex Processing Node | EI Adapter<br>EI Adapter |
| Adapter Response | Represents a response from an Adapter | EI Adapter<br>EI Adapter | Simple Processing Node<br>Complex Processing Node |
| Event Trigger | Represents an event trigger sent from an Adapter to a processing component | EI Adapter | Simple Processing Node<br>Complex Processing Node<br>Filter Node |
| Log Message | Represents writing of a log message to the log destination | Simple Processing Node<br>Complex Processing Node<br>Map<br>Web Service<br>Filter Node<br>Lookup Node<br>Exception Handler | Logger<br>Logger<br>Logger<br>Logger<br>Logger<br>Logger<br>Logger |
| Q Request | Represents a request to a Message Queue to perform a read/write | Simple Processing Node<br>Complex Processing Node<br>Web Service | Message Queue<br>Message Queue<br>Message Queue |

TABLE 12-continued

| Connection Name | Description | Allowed Source Construct(s) | Allowed Destination Construct |
|---|---|---|---|
| Q Response | Represents a response from a Message Queue | Message Queue<br>Message Queue<br>Message Queue | Simple Processing Node<br>Complex Processing Node<br>Web Service |
| File Request | Represents a request to a File to perform a read/write | Simple Processing Node<br>Complex Processing Node<br>Web Service | File<br>File<br>File |
| File Response | Represents a response from a File | File<br>File<br>File | Simple Processing Node<br>Complex Processing Node<br>Web Service |
| Delegate | Represents a delegate action from one construct to another | Simple Processing Node<br>Simple Processing Node<br>Simple Processing Node<br>Complex Processing Node<br>Complex Processing Node<br>Complex Processing Node<br>Filter Node<br>Filter Node<br>Filter Node | Simple Processing Node<br>Complex Processing Node<br>Filter Node<br>Simple Processing Node<br>Complex Processing Node<br>Filter Node<br>Simple Processing Node<br>Complex Processing Node<br>Filter Node |
| Lookup Request | Represents a request to lookup a codes/decodes table | Simple Processing Node<br>Complex Processing Node | Lookup Node<br>Lookup Node |
| Lookup Response | Represents a response from a Lookup Node | Lookup Node<br>Lookup Node | Simple Processing Node<br>Complex Processing Node |
| Raise Exception | Represents the creation of an exception | Simple Processing Node<br>Complex Processing Node<br>Map<br>Filter Node<br>Lookup Node<br>Web Service | Exception Handler<br>Exception Handler<br>Exception Handler<br>Exception Handler<br>Exception Handler<br>Exception Handler |
| Throw Exception | Represents throwing of an exception from one handler to another | Exception Handler | Exception Handler |

Referring once again to FIG. 4, as further illustrated therein, the visual programming environment 402 can interact with patterns 408. In the present context, a pattern is one or more previously configured components that provide more complex solutions and that may be applicable to a given integration design. That is, as opposed to a template component that has not been configured for a particular purpose, a pattern comprises components that have been configured for a particular, potentially related (or even identical) purpose. As previously configured instantiations of template components, the patterns 408 may be stored in one or more suitable storage devices (e.g., server computers) and made available through a suitable network directory structure available through the integrated development environment.

Figure 5:
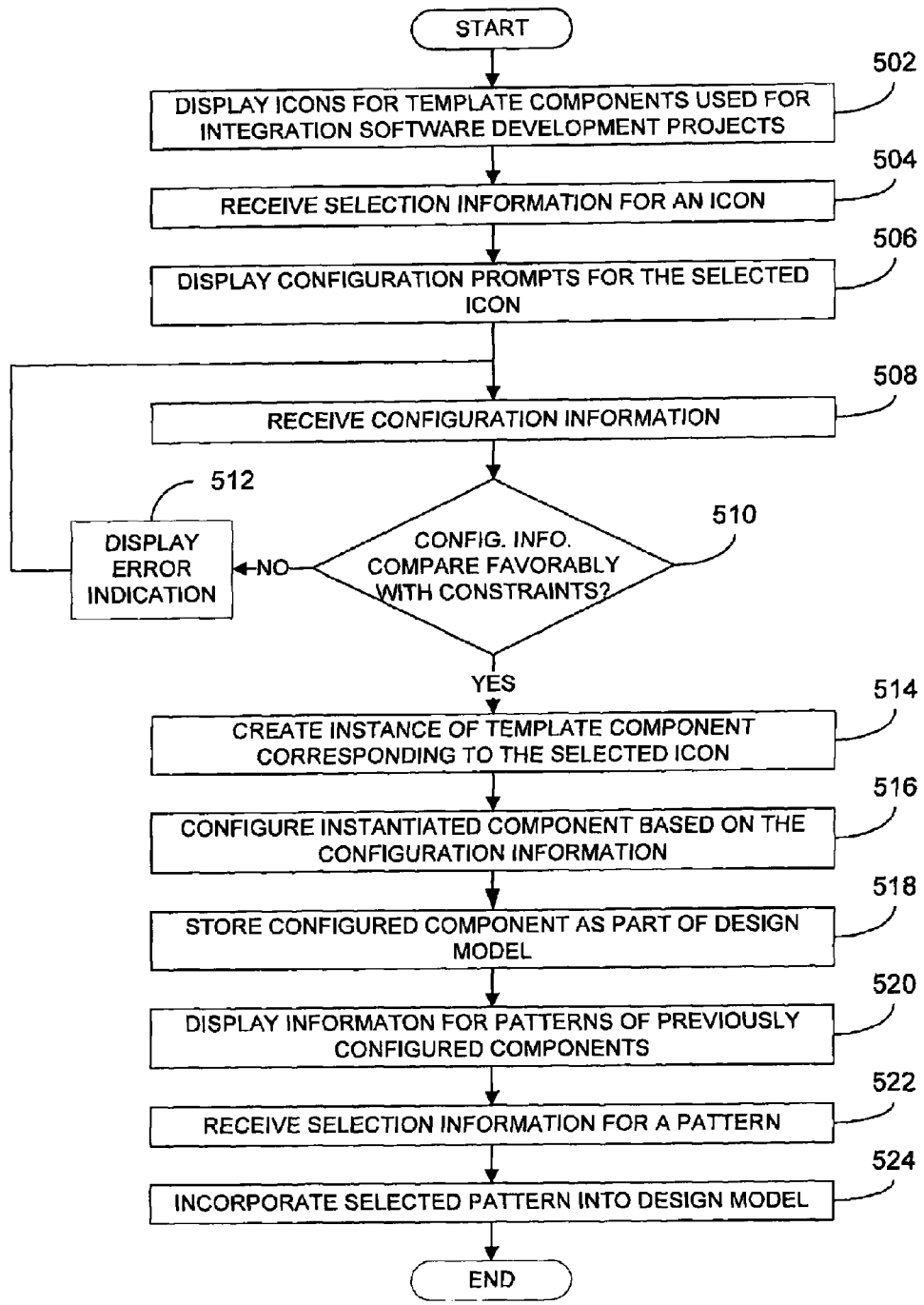
FIG. 5 is a flowchart illustrating processing in accordance with various embodiments described herein.

Referring now to FIG. 5, processing in accordance with an embodiment of the instant disclosure is further described. As noted previously, the processing illustrated in FIG. 5 may be carried out by one or more processing devices, such as the one illustrated in FIG. 3, based on suitable executable instructions or hardware equivalents thereof. For example, the processing of FIG. 5 may be carried out via a laptop or desktop computer implementing the GEMS tool in conjunction with the Eclipse IDE. It is noted that the processing illustrated in FIG. 5 assumes that an appropriate metamodel and, consequently, modeling tool in accordance with the domain-specific constraints of integration software development has been previously defined as described above.

Beginning at block 502, a plurality of icons representative of the template components are displayed via a graphical user interface on a suitable display. An example of this is illustrated in FIG. 6, which shows a graphical user interface 600 comprising a directory window 602, a model development window 606, a model palette 604 and a properties window 608. Such a construction of windows and palettes 602-608 is implemented via the GEMS tools, as known in the art. In this instance, the template components comprise the Integration Flow, EI Adapter, Stateful Integrator, Service, Message Queue, Simple Processing Node, Data Map and Logger template components illustrated within the palette window 604. In this example, each template component is represented by a combination of a graphical icon and text string although those having skill in the art will appreciate that this is not a requirement. In fact, an "icon", as used herein to represent a template component, may comprise any indicia that uniquely identifies the template component relative to the other template components.

At block 504, in response to the display of the plurality of icons, selection information is received corresponding to one of the plurality of icons. In an embodiment, such selection information may be received via a user input device operating in conjunction with the graphical user interface, e.g., a mouse and cursor combination whereby a user positions a cursor over a given icon and clicks a button on the mouse to select the icon. Referring again to the embodiment illustrated in FIG. 6, the selection information may further include information indicating that the user has dragged and dropped (again using, for example, a cursor/mouse combination) the selected icon in the model development window 606. Regardless of the particular form of the selection information, processing continues at block 506 where, in response to the selection information, configuration prompts are displayed via the graphical user interface. Once again, an example of this is illustrated in FIG. 6 in the properties window 608. As shown, the properties window 608 may include prompts corresponding to particular properties (e.g., "Name"). In the particular example illustrated in FIG. 6, the prompts within the properties window 608 correspond to the Logger component 628 named "Broker Logger", the current selection of which is indicated by the heavy outline thereof. Once again, to the extent that the metamodel giving rise to the various template components incorporates the component specific constraints into the definition of each template component, the properties and values solicited in the properties window 608 will, in an embodiment, likewise reflect the component specific constraints. In the context of the specific types of template components described above, non-limiting examples of component specific constraints include: a Simple Processing Node can have only one input and one output; an EI Adapter 620 can send an Event Trigger either to a Simple Processing Node, a Complex Processing Node or a Filter Node; only a Simple Processing Node or a Complex Processing Node may invoke a Map component. Such constraints may also be reflected in the properties window 608. A non-limiting example of this is the Adapter Type attribute (see Table 1 above) of the EI Adapter component, which may be specified in the properties window 608.

At block 508, configuration information corresponding to the selected icon is received in response to the displayed configuration prompts. Note that the form of the configuration information may depend on the nature of the template component corresponding to the selected icon. For example, referring again FIG. 6, the configuration information may be in the form of alphanumerical textual input as illustrated by the "Value" input fields shown in the properties window 608. In another embodiment, the configuration information may be inherent in the manner in which the template component corresponding to the selected icon is deployed within the model development window 606. As noted above, every instance of a Connector specifies the data type that is transferred through it. Thus, the data type transferred by a given Connector is decided by the combination of the type of component and the Connector instance. For example, the data type expected by the "Pass Through Node" 622 as depends on the type of component to which it is connected. That is, by connecting the template component corresponding to the "Pass Through Node" 622 to a certain type of input component, the input data type configured for the "Pass Through Node" 622 is automatically designated. As another example, a given instance of an EI Adapter can be connected to a Complex Processing Node twice, once through an Event Trigger connection passing a data structure of "Type A" from the EI Adapter to the Complex Processing Node, and another time through an Adapter Request connection passing a data structure of "Type B" from the Complex Processing Node to the EI Adapter. In this case, the definition of the Type A and Type B data structures is dictated by the configuration of the EI Adapter and the Complex Processing Node.

Regardless of the manner in which it is received, in an embodiment, as the configuration information for a given template component is received, it is compared at block 510 with the component-specific constraints incorporated into that template component. If the configuration information does not compare favorably with the component-specific constraints, then an error indication is provided via the graphical user interface at block 512. In an embodiment, the component-specific constraints may be represented as one or more rules that may be processed by an rule inference engine (using either forward or backward chaining of antecedents/consequents, as known in the art) against the configuration information. In this embodiment, a "favorable" comparison would occur if none of the configuration information satisfies any negatively configured rule, i.e., a rule configured to define a set of conditions that is to be avoided. On the other hand, an unfavorable comparison would occur if the conditions for any of the negatively defined rules are met by the configuration information. Alternatively, the rules may be defined in a "positive" sense such that a favorable comparison will result only when the configuration information satisfies the conditions established by at least one rule, whereas an unfavorable comparison will result if the configuration information fails to satisfy the conditions of at least one rule.

For example, referring again to FIG. 6, assume that component-specific constraint is that a Data Map component (such as the "Sap to Siebel Data Map for Employee" component 626) cannot be directly coupled to an EI Adapter, such as the "Seibel Adapter01" component 624. An attempt to insert a connection 632 (shown as dotted arrow) between the "Sap to Siebel Data Map for Employee" component 626 and the "Seibel Adapter01" component 624 will cause the connection 632 to blink and/or to be automatically deleted. Those having ordinary skill in the art will appreciate that other indicia (e.g., audible alerts, text warning/error messages, etc.) or combinations thereof may be equally employed for this purpose. Regardless, enforcing such component-specific constraints at this point of the design process prevents design errors that are contrary to best practices in the integration software development domain from being incorporated into the design model. In turn, this translates to a lower likelihood of such errors occurring in the subsequent produced integration software code based on the design model.

Assuming that the configuration information received at block 508 does not compare unfavorably with the component-specific constraints, processing continues at block 514 where an instance of the template component corresponding to the selected icon is created. In an embodiment, an instance of a template component is a line (or lines) in a resulting XML file representative of the model. Thereafter, at block 516, the instantiated component is configured according to the previously received configuration information. Once again, in the context of an XML file used to represent the design model, the configuration information is used to set parameter values in the XML file. Having configured the instantiated component, processing continues at block 518 where the configured component is stored as part of a design model. For example, and with reference to FIG. 3, the design model may be stored as data 318 within the storage component 304, wherein the processing device 300 may comprise a laptop or desktop computer or a network-accessible server computer.

As noted previously, patterns may be used through the visual programming environment. An embodiment of this is illustrated at block 520 where information representative of at least one pattern is displayed via the graphical user interface. An example of this is illustrated in FIG. 7 where a plurality of network folder structures 701 are displayed in a tree format. In the illustrated example, patterns related to a "Company A" project and a "Company B" project are shown. Selection of the pattern (block 522) listed under the "Company A" project, entitled "Return Address" results in the display of that pattern 702. In order to incorporate the selected pattern into a design model, at block 524, a simple cut-and-paste operation may be used, i.e., the pattern is copied and then pasted into the design model as desired. In this manner, the reuse of pre-existing patterns is facilitated, thereby eliminating the need to redesign known functionality.

As described above, the instant disclosure provides a technique for automating the design process of integration software. This is achieved through the use of a visual programming environment where a plurality of template components are display, each template component incorporating component-specific constraints relevant to the integration software development domain. By selecting and configuring instances of these components (again, subject to the component-specific constraints), design models may be rapidly developed. In this manner, the process of designing integration software is made less reliant upon the manual efforts and individual expertise of integration designers.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method comprising:
   determining a metamodel, wherein the metamodel includes syntactic, semantic, and presentation information applicable to a particular domain;
   generating a modeling tool from the metamodel, wherein the modeling tool includes a graphical user interface to enable a user to generate models;
   displaying, via the graphical user interface, a plurality of icons each representative of a corresponding one of a plurality of template components used in integration software development projects, each of the plurality of template components incorporating corresponding component-specific constraints for integration software development;
   receiving, via a user input device, selection information corresponding to an icon of the plurality of icons;
   displaying, via the graphical user interface and responsive to the selection information, configuration prompts for the icon;
   receiving, via the user input device in response to the configuration prompts, configuration information corresponding to the icon;
   responsive to the selection information creating, by the graphical user interface, an instance of a template component of the plurality of template components corresponding to the icon, thereby providing an instantiated component; and
   configuring the instantiated component based on the configuration information subject to the corresponding component-specific constraints, thereby providing a configured component,
   wherein the corresponding component-specific constraints include:
      a constraint that the template component corresponding to the icon includes a node of a simple processing type, wherein the node of the simple processing type comprises only one input and one output;
      a constraint that an adapter component sends an event trigger to the node of the simple processing type or to a node of a complex processing type, wherein the node of the complex processing type comprises multiple inputs and one output; and
      a constraint that only the node of the simple processing type or the node of the complex processing type invokes a map component of the template component.

2. The method of claim 1, further comprising:
   storing the configured component as at least a part of a design model of a software project.

3. The method of claim 2, further comprising:
   displaying, via the graphical use interface, information representative of at least one pattern, each of the at least one pattern comprising at least one previously configured component;
   receiving, via the user input device in response to the information representative of the at least one pattern, selection information corresponding to a pattern of the at least one pattern; and
   incorporating the pattern into the design model.

4. The method of claim 1, wherein configuring the instantiated component further comprises:
   comparing the configuration information with the corresponding component-specific constraints; and
   displaying, via the graphical user interface, an error indication when the configuration information does not satisfy the corresponding component-specific constraints.

5. An apparatus comprising:
   a display;
   a user input device;
   a processor connected to the display and the user input device; and
   a storage device comprising instructions that, when executed by the one processor, cause the processor to:
      determine a metamodel, wherein the metamodel includes syntactic, semantic, and presentation information applicable to a particular domain;
      generate a modeling tool from the metamodel, wherein the modeling tool includes a graphical user interface to enable a user to generate models;
      display, via the graphical user interface, a plurality of icons each representative of a corresponding one of a plurality of template components used in integration software development projects, each of the plurality of template components incorporating corresponding component-specific constraints for integration software development;
      receive, via the user input device, selection information corresponding to an icon of the plurality of icons;
      display, on the display and responsive to the selection information, configuration prompts for the icon;
      receive, via the user input device and the graphical user interface in response to the configuration prompts, configuration information corresponding to the icon;
      responsive to the selection information, create an instance of a template component of the plurality of template components corresponding to the icon, thereby providing an instantiated component; and
      configure, by the graphical user interface, the instantiated component based on the configuration information subject to the corresponding component-specific constraints, thereby providing a configured component,
   wherein the corresponding component-specific constraints include:
      a constraint that the template component corresponding to the icon includes a node of a simple processing type, wherein the node of the simple processing type comprises only one input and one output;
      a constraint that an adapter component sends an event trigger to the node of the simple processing type or to a node of a complex processing type, wherein the node of the complex processing type comprises multiple inputs and one output; and
      a constraint that only the node of the simple processing type or the node of the complex processing type invokes a map component of the template component.

6. The apparatus of claim 5, the storage device further comprising instructions that, when executed, cause the processor to:
   store the configured component as at least a part of a design model of a software project.

7. The apparatus of claim 6, the storage device further comprising instructions that, when executed, cause the processor to:

display, via the display, information representative of at least one pattern, each of the at least one pattern comprising at least one previously configured component;

receive, via the user input device in response to the information representative of the at least one pattern, selection information corresponding to a pattern of the at least one pattern; and incorporate the pattern into the design model.

8. The apparatus of claim 5, wherein the instructions operative to cause the processor to configure the instantiated component are further operative to cause the processor to:

compare the configuration information with the corresponding component-specific constraints; and display, via the display, an error indication in response to a determination that the configuration information does not satisfy the corresponding component-specific constraints.

9. The apparatus of claim 5, wherein the processor is to, as the configuration information is received, determine whether the configuration information satisfies the corresponding component-specific constraints; and in response to the configuration information satisfying the corresponding component-specific constraints, create the instance of the template component.

10. The apparatus of claim 5, wherein the template component corresponding to the icon for which the configuration is received is the adapter component, wherein the adapter component provides connectivity to a specific type of software system and executes transactions on the specific type of software system or detects changes in the specific type of software system, wherein the component-specific constraints identify a plurality of types of software systems that are acceptable to be connected to by the adapter component, and the configuration information satisfies the corresponding component-specific constraints in response to a determination that the configuration information is one of the plurality of types of software systems.

11. The method of claim 1, further comprising:

as the configuration information is received, determining whether the configuration information satisfies the corresponding component-specific constraints; and in response to the configuration information satisfying the corresponding component-specific constraints, creating the instance of the template component.

12. The method of claim 1, wherein the template component corresponding to the icon for which the configuration is received is the adapter component, wherein the adapter component provides connectivity to a specific type of software system and executes transactions on the specific type of software system or detects changes in the specific type of software system, wherein the component-specific constraints identify a plurality of types of software systems that are acceptable to be connected to by the adapter component, and the configuration information satisfies the corresponding component-specific constraints in response to a determination that the configuration information is one of the plurality of types of software systems.

13. The method of claim 1, wherein the template component corresponding to the icon for which the configuration is received includes a connector connecting other components in a model, wherein the corresponding component-specific constraints identify types of components that are acceptable to be connected by the connector in the model, and the configuration information satisfies the corresponding component-specific constraints in response to a determination that the configuration information is one of the types of components.

14. An apparatus comprising:
a processor; and
a memory to store a model generated by the processor, wherein the processor is to:

determine a metamodel defining properties of models operable to be created according to the metamodel;

generate a modeling tool from the metamodel, wherein the modeling tool includes a graphical user interface to enable a user to generate the model according to the metamodel;

display, via the graphical user interface, template components, each template component representing a different functionality of integration software development and including corresponding component-specific constraints on using the template component in the model;

receive, via the graphical user interface, a selection of one of the displayed template components;

receive, via the graphical user interface, configuration information corresponding to the selected template component;

as the configuration information is received, determine whether the configuration information satisfies the corresponding component-specific constraints for the selected template component;

in response to the configuration information satisfying the corresponding component-specific constraints, create an instance of the selected template component, thereby providing an instantiated template component; and store the instantiated template component as a component of the model in the memory, wherein the corresponding component-specific constraints include:

a constraint that the selected template component comprises a node of a simple processing type, wherein the node of the simple processing type comprises only one input and one output;

a constraint that an adapter component sends an event trigger to the node of the simple processing type or to a node of a complex processing type, wherein the node of the complex processing type comprises multiple inputs and one output; and a constraint that only the node of the simple processing type or the node of the complex processing type invokes a map component.

15. The apparatus of claim 14, wherein the selected template component is the adapter component providing connectivity to a specific type of software system and executing transactions on the specific type of software system or detecting changes in the specific type of software system, wherein the corresponding component-specific constraints identifies a plurality of types of software systems that are acceptable to be connected to by the adapter component, and the configuration information satisfies the corresponding component-specific constraints if the configuration information is one of the plurality of types of software systems.

16. The apparatus of claim 14, wherein the selected template component includes a connector connecting other components in the model, wherein the corresponding component-specific constraints for the connector identifies types of components that are acceptable to be connected by the connector in the model, and the configuration information satisfies the corresponding component-specific constraints for the connector if the configuration information is one of the types of components.

17. The apparatus of claim 14, wherein the template components include a message queue storing messages for processing, a web service supporting interoperable machine-to-machine interaction over a network, the map component transforming a source data structure into a destination data structure, and a lookup node looking up code in a data store to determine a decoded value.

18. The apparatus of claim 14, wherein the corresponding component-specific constraints for the template components are constraints on using the template components in the model based on reliability, testability, efficiency or usability of software generated from previous models including the template components.

19. The apparatus of claim 14, wherein the processor is to generate an error indication if the configuration information does not satisfy the corresponding component-specific constraints.

20. The apparatus of claim 14, wherein the processor is to:
display, via the graphical user interface, information representative of at least one pattern comprising at least one previously configured component;
receive a selection of the at least one pattern; and
incorporate the at least one pattern into the model.

\* \* \* \* \*

UNITED STATES PATENT AND TRADEMARK OFFICE
CERTIFICATE OF CORRECTION

PATENT NO. : 8,701,080 B2  
APPLICATION NO. : 13/050342  
DATED : April 15, 2014  
INVENTOR(S) : Debadatta Tripathi Page 1 of 1

It is certified that error appears in the above-identified patent and that said Letters Patent is hereby corrected as shown below:

In the Claims

Claim 1, Column 13, line 54, delete "of the template component".

Claim 5, Column 14, line 59, delete "of the template component".

Signed and Sealed this
Twenty-fourth Day of June, 2014

Michelle K. Lee
*Deputy Director of the United States Patent and Trademark Office*